Aug. 18, 1925.

C. D. HAGERTY

ROD SUPPORT

Filed Nov. 17, 1924

1,550,541

C. D. Hagerty
INVENTOR

BY Victor J. Evans
ATTORNEY

WITNESS:

Patented Aug. 18, 1925.

1,550,541

UNITED STATES PATENT OFFICE.

CLEMENT D. HAGERTY, OF DETROIT, MICHIGAN.

ROD SUPPORT.

Application filed November 17, 1924. Serial No. 750,510.

*To all whom it may concern:*

Be it known that I, CLEMENT D. HAGERTY, a citizen of the United States, residing at Detroit, in the county of Wayne and State of Michigan, have invented new and useful Improvements in Rod Supports, of which the following is a specification.

This invention contemplates the provision of a device designed to support the front radius rod on a Ford automobile, to prevent the rod from dropping in event the studs become separated from the socket which accommodates the rear end of said rod, which frequently happens causing the front wheels to buckle or lock over the center, with a consequent loss of control of the car. The invention is further useful in eliminating noise and rattling of the rod when the ball socket becomes worn, and is of a character which can be easily attached to the car without making any alterations thereon, and by utilizing the crank case bolts.

The nature and advantages of the invention will be better understood when the following detailed description is read in connection with the accompanying drawing, the invention residing in the construction, combination and arrangement of parts as claimed.

In the drawing forming part of this application like numerals of reference indicate similar parts in the several views, and wherein.

Figure 1:
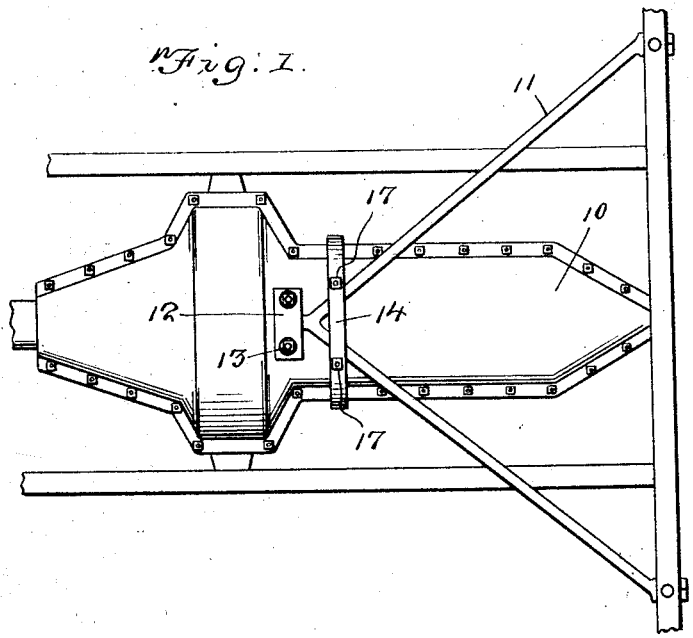
Figure 1 is a bottom plan view showing the application of the invention.

Referring to the drawing in detail, 10 represents the crank case of a motor, while 11 represents the radius rod employed in Ford automobile constructions, the rear end of this rod is of course, formed with a ball which is adapted to be received by a socket 12 immediately in advance of the transmission as will be readily understood.

Figure 2:
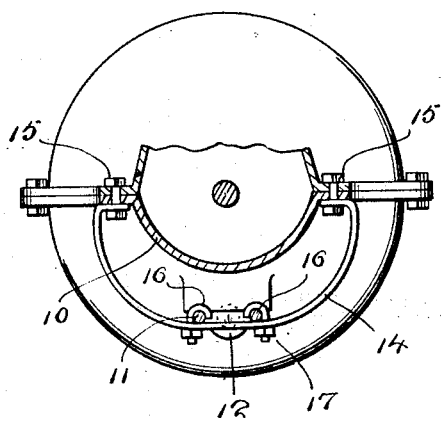
Figure 2 is a transverse sectional view.
Figure 3:
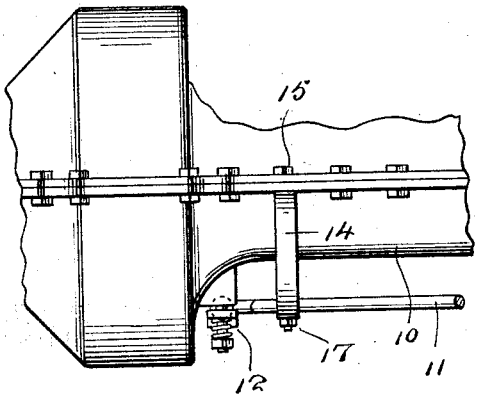
Figure 3 is a fragmentary view showing the invention in side elevation.

The device forming the subject matter of the present invention is employed to support the radius rod 11 in a manner to prevent the rear end of the rod from dropping toward the ground in event the studs 13 of the socket member become separated therefrom, which usually brings about the result above enumerated. The device is in the nature of a substantially U-shaped member 14 preferably constructed of resilient material, and adapted to pass beneath the radius rod at a point adjacent the socket member 12 as shown in Figures 1 and 3. The free extremities of the member 14 are turned inwardly and provided with openings to receive the adjacent crank case bolt 15, so that the device can be arranged in position for use and secured to the crank case in quick and convenient manner, and without the necessity of employing additional fastening elements other than the crank case bolts above referred to. The intermediate portion of the member 14 is also clamped to the sections of the radius rods by means of hook bolts 16 which pass over the sections of the rod 11 and through openings in the intermediate portions of the member 14, each of these hook bolts being provided with a nut 17 as shown in Figure 2. In addition to preventing the radius rod from dropping to the ground should the same become separated from the socket member 12, the invention is particularly useful in preventing rattling of said rod when the ball and socket become worn. The invention is extremely simple in construction, and can be manufactured and sold at a nominal cost and can be very easily arranged in position for use.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

An auxiliary radius rod support of the character described comprising a substantially U-shaped member upon which the said rod is adapted to repose, the free ends of said member being offset and having openings to receive the adjacent crank case bolts for securing the member to the crank case, hook bolts straddling the respective sections of said rod and having their shanks passed through openings in said member, and a nut associated with the shank of each bolt.

In testimony whereof I affix my signature.

CLEMENT D. HAGERTY.